United States Patent

Nagao et al.

[11] Patent Number: 5,740,694
[45] Date of Patent: Apr. 21, 1998

[54] STARTER WITH PLANETARY REDUCTION GEAR MECHANISM

[75] Inventors: Yasuhiro Nagao, Okazaki; Mitsuhiro Murata, Anjo, both of Japan

[73] Assignee: Nippondenso Co., Ltd., Kariya, Japan

[21] Appl. No.: 654,686

[22] Filed: May 29, 1996

[30] Foreign Application Priority Data

Jun. 1, 1995 [JP] Japan .................. 7-135365

[51] Int. Cl.$^6$ ...................... F02N 11/02
[52] U.S. Cl. ............ 74/7 E; 74/7 A; 192/45
[58] Field of Search .......... 74/7 E, 7 A; 192/45; 475/263, 267, 318; 188/82, 84

[56] References Cited

U.S. PATENT DOCUMENTS

| | | | |
|---|---|---|---|
| 1,443,248 | 1/1923 | Defordt | 192/45 |
| 4,852,708 | 8/1989 | Parkhurst | 192/45 |
| 4,862,027 | 8/1989 | Isozumi et al. | 74/7 E X |
| 4,881,698 | 11/1989 | Doiron | 192/45 X |
| 4,986,140 | 1/1991 | Morishita et al. | 74/7 E X |
| 5,471,890 | 12/1995 | Shiga et al. | 74/7 E |
| 5,473,956 | 12/1995 | Murata et al. | 74/7 E |

FOREIGN PATENT DOCUMENTS 52-19528  2/1977  Japan.

*Primary Examiner*—Rodney H. Bonck
*Assistant Examiner*—Troy Grabow
*Attorney, Agent, or Firm*—Cushman Darby & Cushman IP Group of Pillsbury Madison & Sutro LLP

[57] ABSTRACT

A plurality of rollers is accommodated in respective roller-accommodating grooves formed on an inner peripheral face of a clutch outer member integral with a planet carrier connected with an output shaft. The rollers contact a peripheral face (roller-contact face) of a clutch inner member integral with a stationary member. Roller-engaging grooves are formed on an outer peripheral face of the clutch inner member.

11 Claims, 2 Drawing Sheets

STARTER WITH PLANETARY REDUCTION GEAR MECHANISM

BACKGROUND OF THE INVENTION

1. Field of the Invention

The present invention relates to a starter with a planetary reduction gear and a one-way clutch provided between the planetary reduction gear and a stationary member.

2. Description of Related Art

A starter provided with an planetary reduction gear disclosed in Japanese Utility Model Publication Laid-open No. 52-19528 comprises a one-way clutch interposed between the peripheral face of an internal gear of the planetary reduction gear and the inner peripheral face of a casing surrounding the planetary reduction gear.

The abovedescribed starter further comprises an accommodating groove, formed on the inner peripheral face of the casing, for accommodating rollers serving as a transmission member and springs for urging the roller toward a clutch-connection direction (i.e., to the side at which internal gear of one-way clutch is positioned). In this construction, it is necessary to bring the roller into contact with an internal gear of a greater diameter at a constant force in order to connect the internal gear and a housing with each other in driving an engine. As a result, the roller contacts the peripheral face of the internal gear at the constant force when the starter overruns. Therefore, the starter has a problem that the roller has a shorter life because the roller becomes worn due to its contact with the peripheral face of the internal gear. In order to overcome this problem, grease having a low friction coefficient can be adopted to minimize the wear problem of the roller. The use of grease, however, makes it necessary to press the roller at a greater force against the peripheral face of the internal gear serving as a clutch inner member, in correspondence to the reduced frictional force between the roller and peripheral face of the internal gear in order to secure a required clutch-connection force. Consequently, it is inevitable to manufacture a large and heavy clutch to endure the increased force to be applied to the internal gear in pressing the roller against the internal gear.

The deformation of the internal gear resulting from the pressing force applied thereto causes the reduction in the force of friction between the roller and peripheral face of the internal gear and the reduction in the clutch-connection force. Thus, it is difficult to make the internal gear light because it is necessary to maintain the strength of the internal gear. The increase in the weight of the internal gear and the diameter thereof, however, causes the increase of the inertia mass thereof. In the shift from a pinion-driving state to the overrunning state, the internal gear absorbs an excess rotation of the pinion, thus receiving an engine torque between a state in which the internal gear is stopped and it rotates at a high speed. When the inertia mass of the internal gear is great, an apparent drag torque of clutch increases when the internal gear shifts from its stop state to a high rotation state. As a result, the engine torque is increasingly transmitted to an armature of a motor, thus increasing a possibility that the armature rotates at a higher speed and in addition, a load is applied from the starter to the engine. In this case, the start of the engine rotation at an initial air-fuel mixture combustion in the engine is prevented, which deteriorates the ignition performance of the engine.

Further, frictional heat generated by the one-way clutch in the overrunning state is proportional to (frictional force)× (peripheral speed of circumferential face of internal gear). Thus, if the circumferential speed of the internal gear is high, it is necessary to consider heat generated by the one-way clutch and a change in the friction coefficient of the clutch.

SUMMARY OF THE INVENTION

In view of the above-described problems in conventional starters, it is an object of the present invention to provide a starter in which wear of rollers are reduced.

According to the present invention, a planet carrier is connected with a pinion; rollers are accommodated in corresponding roller-accommodating grooves formed on the planet carrier; and urging springs press the rollers against the peripheral face of a stationary member, namely, a clutch inner member. With this construction, when the pinion is driven, the torque of the planet carrier is transmitted to the stationary member through the rollers. Thus, the rotation of the planet carrier is prohibited.

In an overrunning state, the planet carrier rotates together with the rollers. A centrifugal force generated by the rotation of the planet carrier causes the rollers to shift in a clutch-disconnection direction against the force of the urging springs. Therefore, the friction between the peripheral face, namely, the roller-contact face of the stationary member and the rollers is reduced in the overrunning state.

In the overrunning state, this construction is capable of reducing the frictional force between the roller-contact face of the stationary member and the rollers to a greater extent than the conventional planetary reduction gear integral with the one-way clutch, thus reducing the wear of the rollers to a greater extent and drag torque in the overrunning state.

In addition, when a pinion-driving state starts at the termination of the overrunning state, the planet carrier and an internal gear rotating together with the rollers is stopped. At this time, no centrifugal force is applied to the rollers and the rollers can be pressed against the peripheral face of the stationary member and in particular against the roller-engaging groove without the force of the urging springs being reduced. Thus, the clutch-connection force of the one-way clutch can be reliably secured in the pinion-driving state.

Preferably, roller-engaging grooves are formed on the peripheral face of the stationary member, thus eliminating the need for providing a high coefficient of friction between the peripheral face of the stationary member and the rollers. It is unnecessary to press the clutch inner and outer members against the peripheral face of the stationary member at a great force, which allows the use of a planet carrier having a low strength and rigidity. Therefore, they can be allowed to be light and have a less strength and thus, it is possible to reduce the inertia mass of the planet carrier when it is not connected with the pinion and thus idles in the overrunning state, which makes it possible to shift the overrunning state to the pinion-driving state promptly.

More preferably, the number of the roller-engaging grooves is set to be greater than that of the rollers, and the interval between the adjacent roller-engaging grooves is shorter than that between the adjacent roller-accommodating grooves. Therefore, before transmitting the torque of the planet carrier from the planet carrier to the stationary member through the rollers in mesh with the roller-engaging grooves in the pinion-driving state, the rollers can be guided into the roller-accommodating grooves in a short idle running distance in the transition state period between the overrunning state and the pinion-driving state. Therefore, the rollers can be allowed to contact with the peripheral face of the stationary member at a small torque. That is, the torque of the rollers is small when it is rotating around the center of the stationary member.

3

Preferably, the roller-contact face of the stationary member and the rollers can be positioned at the inner side of the inner peripheral face of the internal gear. This reduces the peripheral speed of the roller-contact face and the wear degree of the rollers; prolongs the life of the rollers; reduce the diameter of the entire clutch; and reduces the degree of frictional heat to be generated in the overrunning state.

BRIEF DESCRIPTION OF THE DRAWINGS

Other features, characteristics, and advantages of the present invention will become more apparent to a person of ordinary skill in the art from the following detailed description, drawings, and claims, all of which form a part of this application. In the drawings:

DESCRIPTION OF THE PRESENTLY PREFERRED EMBODIMENTS

A starter according to an embodiment of the present invention will be described below with reference to FIGS. 1 through 3.

Figure 1:
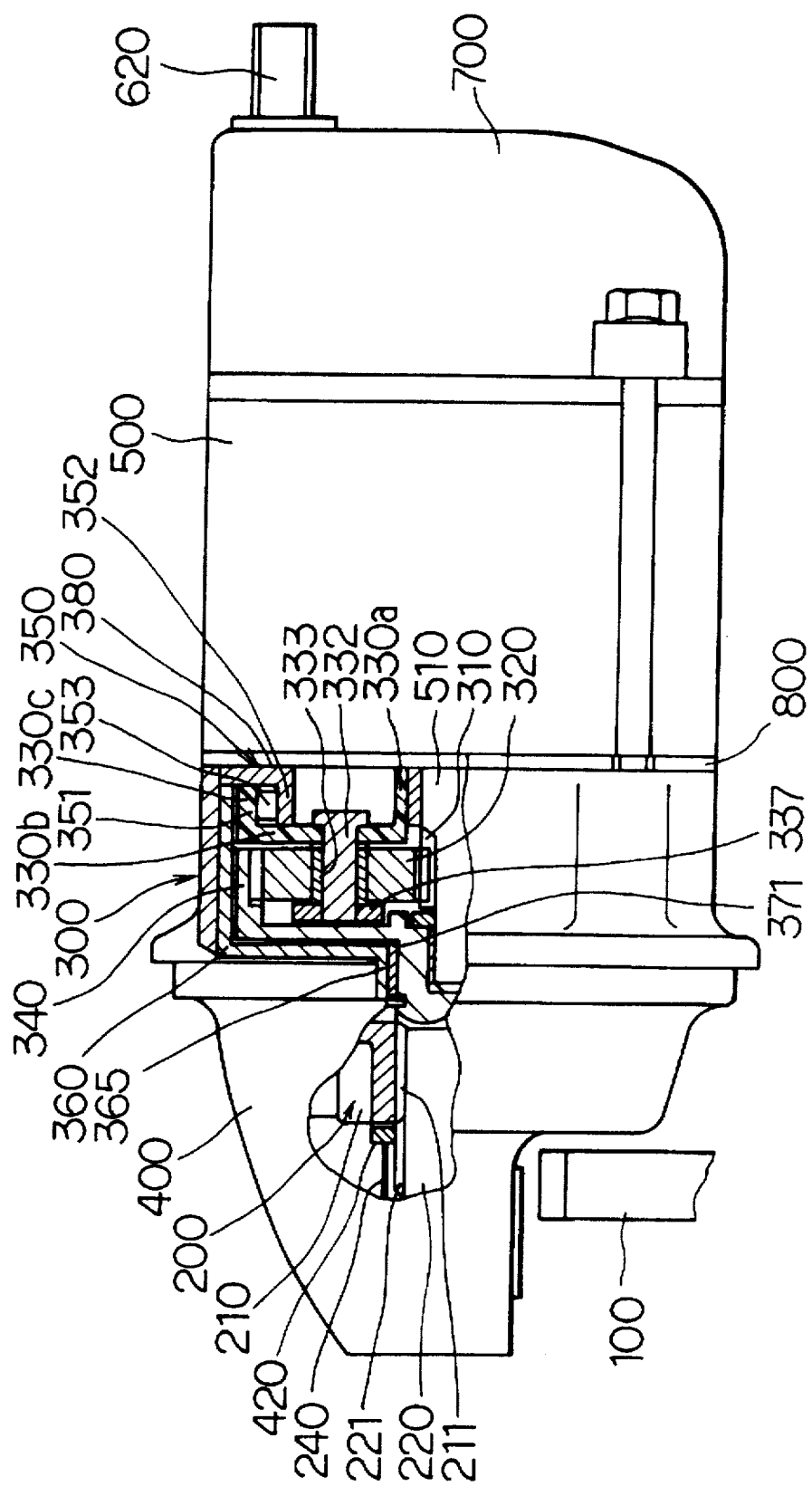
FIG. 1 is a side elevational view, partly in section, showing a starter according to an embodiment of the present invention.

As shown in FIG. 1, the starter comprises a housing 400 accommodating a pinion 200 engageable with a ring gear 100 installed on an engine (not shown) and a planetary gear mechanism 300; a motor 500; and an end frame 700 accommodating a magnet switch 600 (not shown) therein connected with a terminal bolt 620 for electric power supply from a battery. A motor-partitioning wall 800 partitions the starter into the housing 400 and the motor 500.

[Pinion 200]

The pinion 200 has a pinion gear 210 for engagement with the ring gear 100 of the engine. The pinion gear 210 has, on the inner peripheral face thereof, a pinion helical spline 211 fitting into a helical spline 221 formed on an output shaft 220. The pinion gear 210 is kept to be urged toward the rear (right side in FIG. 1) of the output shaft 220 by a return spring 240 composed of a compression coil spring. In the embodiment, the return spring 240 urges the pinion gear 210 not directly but through a ring member 420.

[Planetary Gear Mechanism 300]

As shown in FIG. 1, a planetary gear mechanism 300 serves as means for reducing the number of rotations of the motor 500 to increase the output torque of the motor 500. The planetary gear mechanism 300 comprises a sun gear 310 formed on the outer periphery of an armature shaft 510 at a front side (left side in FIG. 1) thereof; a plurality of planetary gears 320 engaging the sun gear 310 and rotatable around the sun gear 310; and a cylindrical internal gear 340 engaging the planetary gear 320 at the internal periphery thereof.

[Planet Carrier 330]

A planet carrier 330 is made of resin and comprises a first cylindrical portion 330a held on the outer periphery of the armature shaft 510 through a bearing; a plane disk portion 330b confronting the planetary gear 320; and a second cylindrical portion 330c extending rearward from an end of the outer periphery of the plane portion 330b. A pin 332 fixed to the plane portion 330b of the planet carrier 330 holds the planetary gears 320 rotatably thereon through a bearing 333. Further, a plate 337 for regulating a forward displacement of the planetary gear 320 in the axial direction thereof is fitted into the pin 332 at the front end thereof.

[One-way clutch 350]

Figure 2:
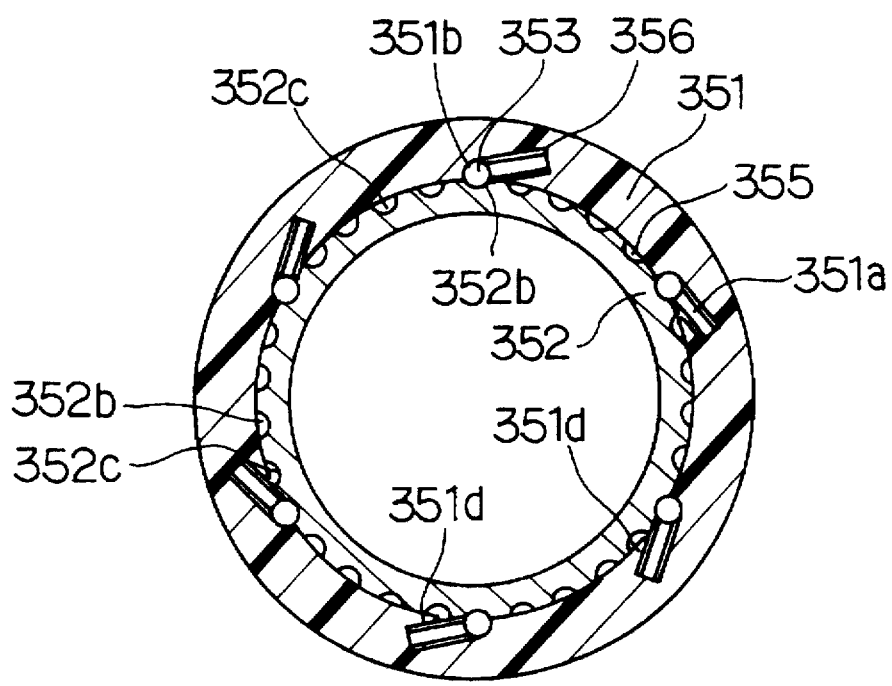
FIG. 2 is a sectional view, in a diametrical direction, showing a one-way clutch shown in FIG. 1 in a cranking time.
Figure 3:
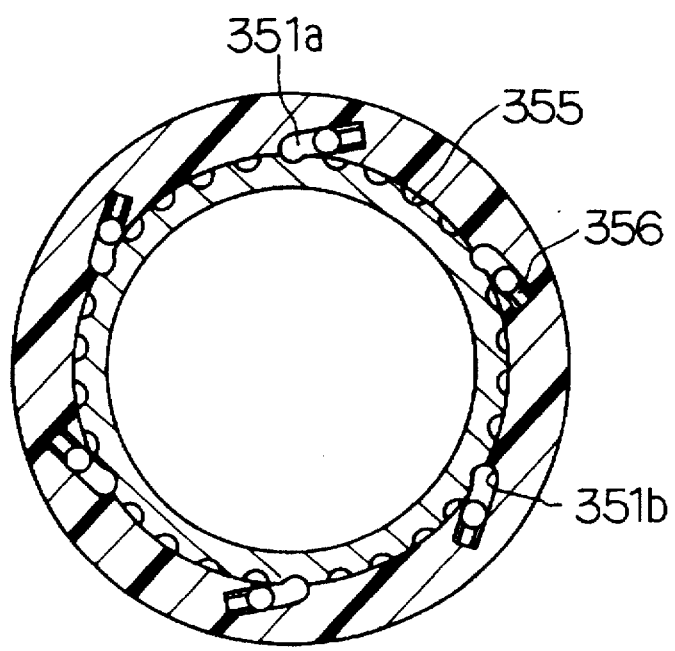
FIG. 3 is a sectional view, in a diametrical direction, showing the one-way clutch shown in FIG. 1 in an overrunning time.

As shown in FIGS. 2 and 3 in greater detail, a one-way clutch 350 supports the planet carrier 330 rotatably in only one direction (only in direction in which planet carrier 330 rotates, subjected to the rotation of engine).

The one-way clutch 350 comprises an outer member 351 consisting of a second cylindrical portion 330c of the planet carrier 330; an inner member 352 which consists of a cylindrical portion of a stationary member 380 fixed between a center bracket 360 and the motor 500 and which is positioned along the inner peripheral face of the clutch outer member 351, in opposition to the inner periphery of the clutch outer member 351; and a plurality of rollers 353 accommodated and biased by respective coil springs 356 in a roller-accommodating portion (roller accommodating grooves) 351a formed on the inner peripheral face of the clutch outer member 351. The roller-accommodating portion 351a has an inclination with respect to the circumferential direction of the clutch outer member 351 and has a roller-engaging face 351b which engages the roller 353 when the starter is actuated.

A plurality of roller-engaging grooves 355 is formed on the entire circumference of the clutch inner member 352 on the peripheral face thereof. Each of the roller-engaging grooves 355 has a roller-engaging face 352b which engages the roller 353 when the starter is actuated; and a roller guide face 352c for guiding the roller 353 to the roller-engaging face 352b. The roller-accommodating portion 351a comprises a roller accommodating/guiding portion 351d which confronts the roller-engaging face 351b and serves as means for guiding the roller 353 into the roller-accommodating portion 351a when the starter overruns. The roller-engaging face 351b of the clutch outer member 351 and the roller-engaging face 352b of the clutch inner member 352 are so positioned that when the starter is driven for engine cranking, the roller-engaging faces 351b and 352b sandwich the roller 353 therebetween longitudinally in the torque transmission direction (FIG. 2). At the time of overrunning of the starter, the rollers 353 should be moved deep into the roller-accommodating portion 351a, disengaging from the engaging face 351b, so that the diameter of a circle formed by connecting the inner side of each roller 353 is a little greater than that of the outer diameter of the clutch inner member 352 (FIG. 3).

As described above, the second cylindrical portion 330c formed on the planet carrier 330 of the planetary gear mechanism 300 serves as the clutch outer member 351. The second cylindrical portion of the center bracket 360 constituting the stationary side of the clutch, i.e., serves as the clutch inner member 352. In addition, the roller-accommodating portion 351a is formed on the inner peripheral face of the clutch outer member 351. According to the above-described construction, when the planet carrier 330 serving as the clutch outer member 351 idles with respect to the clutch inner member 352 such that the planet carrier 330 and hence internal gear 340 absorbs the difference between the number of rotations of the motor 500 and the pinion gear 210 when the starter is overrun by the engine, a centrifugal force is applied to the rollers 353 in a direction in which the rollers 353 are moved away from the peripheral face of the clutch inner member 352 or it is moved away therefrom. Consequently, a force for pressing the rollers 353 against the outer peripheral face of the clutch inner member 352 is suppressed, thus preventing the roller 353 and the peripheral face of the clutch inner member 352 from being worn.

The roller-engaging grooves 355 are formed at the point of contact between the roller-engaging face 352b and the roller 353 so as to allow a stress to be applied to the rollers 353 and the roller-engaging face 352b in a small extent. Thus, a compact and light one-way clutch can be manufactured. It is to be noted that the roller-engaging grooves 355 are provided more in number than the roller-accommodating grooves 351a.

[Center Bracket 360]

As shown in FIG. 1, the center bracket 360 provided inside the housing 400 accommodates the planetary gear mechanism 300 and the one-way clutch 350. One end of the output shaft 220 is rotatably supported by a center bracket bearing 371 fixed to the inner cylindrical portion 365 of the center bracket 360.

[Motor 500]

The motor 500 is surrounded with a yoke (not shown), the motor-partitioning wall 800, and a brush-holding member (not shown). The planetary gear mechanism 300 is accommodated between the center bracket 360 and the motor-partitioning wall 800 having a function of preventing lubricating oil present inside the planetary gear mechanism 300 from penetrating into the motor 500.

As known well in the art, the motor 500 comprises the armature shaft 510; an armature fixed to the armature shaft 510 and composed of an iron core and an armature coil and rotating together therewith; and fixed magnetic poles for rotating the armature. The fixed magnetic poles are fixed to the inner peripheral face of the yoke.

[Fundamental Operation]

When a key switch (not shown) is set at a start position, an attraction coil of the magnet switch in the end bracket is energized with electric current supplied by the battery. As a result, the contact point of the magnet switch is turned on, thus energizing the motor 500 through the terminal bolt 620. At this time, a pinion-moving device (not shown) moves the pinion 200 to the position at which the pinion gear 210 engages the ring gear 100. Then, a rotational force generated by the motor 500 is transmitted to the planetary gear mechanism 300 through the armature shaft 510. As a result, the torque of the motor 500 is increased and transmitted to the planet carrier 330 and then to the pinion 200 through the helical splines 221 and 211, and then to the ring gear 100. In this manner, the engine is driven by the starter.

When the ring gear 100 of the engine is rotated at a higher speed than the pinion gear 210, the pinion 200 is rotated by the rotation of the ring gear 100. The torque is transmitted from the ring gear 100 to the pins 332 supporting the planetary gears 320 through the output shaft 220 and the internal gear 340. At this time, the direction of the torque applied to the planet carrier 330 through the pins 332 is reverse to the torque applied thereto at the start time of the engine. Therefore, the one-way clutch 350 permits the rotation of the ring gear 100. That is, when the torque in the abovedescribed reverse direction is applied to the planet carrier 330, the planet carrier 330 is allowed to start rotation. The rollers 353 of the one-way clutch 350 move away from the clutch inner member 352 due to the centrifugal force generated by the rotation of the planet carrier 330. Consequently, the planet carrier 330 is allowed to continue its rotation.

That is, the force of the relative rotation of the pinion 200 caused by the rotation of the ring gear 100 is absorbed by the one-way clutch 350. Thus, the armature is not driven by the engine. When the engine starts, the key switch is placed out of the start position. As a result, the attraction coil of the magnet switch is deenergized to stop motor rotation.

As a result, the contact point of the magnet switch is turned off and at the same time, the pinion-moving device returns to the original state, and the return spring 240 disengages the pinion gear 210 from the ring gear 100, thus returning the pinion gear 210 to the original position.

Drive Time; Cranking Time

As shown in FIG. 2, when the engine is to be driven by the starter, the torque transmission member, namely, each roller 353 is accommodated in a space formed of the roller-accommodating portion 351a of the clutch outer member 351 and the roller-engaging groove 355 of the clutch inner member 352, and the torque is transmitted to the engine through the cam faces 351b and 352b (roller-engaging faces) and the transmission member, namely, the roller 353.

Overrunning Time

As shown in FIG. 3, when the starter overruns, the rollers 353 move radially outwardly along the roller guide face 352c by the centrifugal force of the rollers 353 themselves against the pressing force of the coil springs 356 composed of an elastic material serving as urging means. As a result, each roller 353 is accommodated deeply in the roller-accommodating portion 351a of the clutch outer member 351. Therefore, the clutch inner member 352 becomes out of contact with or disengages from the clutch outer member 351 as well as the rollers 353.

Restarting After Engine Stall

Supposing that the number of rotations of the rotating planet carrier 330 connected with the pinion 200 in mesh with the ring gear 100 of the engine is Nc; the number of rotations of the internal gear 340 connected with the clutch outer member 351 is Ni; the number of rotations of the armature having the sun gear 310 mounted at the leading end thereof is Ns; the number of inner teeth of the internal gear 340 is Zi; and the number of outer teeth of the sun gear 310 is Zs, the following relationship is established according to the characteristic of the planetary reduction gear mechanism. Unlike the conventional clutch, the relationship shown by Equation 1 below determines the relationship among the number of rotations of the armature, the number of rotations of the engine, and the number of rotations of the rollers 353 which determines the centrifugal force thereof.

[Equation 1]

$$Ni = Nc - (Ns - Nc) \times Zs/Zi$$

When the operation of the shaft of the planet carrier 330 is stopped, namely, when Nc=0, the Equation 1 is expressed as follows:

$Ni=-Ns \times Zs/Zi$

Accordingly, when the starter is actuated, no centrifugal force is applied to the rollers 353.

Accordingly, in the clutch according to the present embodiment, in driving the engine again because the engine is stopped immediately after it has been actuated, the planet carrier 330 rotating to absorb the difference between the number of rotations of the engine and that of the armature shaft 510 follows a rapid reduction in the rotation speed of the engine. As a result, the rotation speed of the planet carrier 330 is reduced rapidly. Before the starter starts to drive the engine, the planet carrier 330 reduces its rotation speed and thus a centrifugal force is not applied to the rollers 353. Consequently, the coil springs 356 reliably presses the roller 353 to the stationary side, namely, the clutch inner member 352 and no centrifugal force is applied to the rollers 353. The engine is smoothly driven after the planet carrier 330 stops. That is, before the engine is stopped completely, the armature shaft 510 drives the output shaft 220 from a stage at which the number of the rotations of the armature shaft 510 has become the one corresponding to the number of rotations of the engine. Therefore, there is no difference between the number of rotations of the engine and that of the armature shaft 510 and thus, no great shock is generated when the engine is driven.

As apparent from the foregoing description, when the overrunning state shifts to a pinion-driving state, no centrifugal force is applied to the rollers 353. Thus, the load of the coil springs 356 to be applied to the rollers 353 is allowed to be greatly reduced, as compared with the load of the conventional coil spring to be applied to the rollers. Thus, the shape of the coil spring 356 and that of each groove can be modified as desired.

As compared with the conventional starter, the starter according to the embodiment can reduce a great shock when the overrunning state shifts to the pinion-driving state, namely, the cranking state, and it is unnecessary to keep the rollers 353 in contact with the clutch inner member 352. Further, even at a low speed in the overrunning state, the rollers 353 can be moved assuredly away from the clutch inner member 352. Therefore, when the rollers 353 are brought into contact with the clutch inner member 352, the entire clutch can be prevented from being shaken and the rollers 353 and the clutch inner member 352 can be prevented from being worn and further, a big noise can be prevented from being generated. Consequently, the entire starter can be allowed to be made compact and durable.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A starter comprising:

a pinion engageable with a ring gear of an engine;

a motor having an armature and an output shaft for transmitting a rotation thereof to the pinion;

a stationary member;

a planetary reduction gear mechanism including a sun gear provided on the output shaft of the motor, a planetary gear engaging the sun gear, a planet carrier supporting the planetary gear rotatably thereon and rotatable relative to the sun gear, and an internal gear surrounding and engaging the planetary gear to rotate the pinion; and a one-way clutch including a plurality of rollers accommodated in each of a plurality of roller-accommodating grooves formed on a peripheral face of the planet carrier and contacting a peripheral face of the stationary member, and urging means held by the planet carrier to urge the rollers toward the peripheral face of the stationary member, wherein the peripheral face of the planet carrier is placed radially outside the peripheral face of the stationary member, and the rollers are adapted to shift, by a centrifugal force of rotation of the planet carrier, to a clutch-disconnection side against the urging force of the urging means in an overrunning time.

2. The starter according to claim 1, wherein:

the one-way clutch further includes roller-engaging grooves formed on the peripheral face of the stationary member to engage the rollers thereon.

3. The starter according to claim 2, wherein:

the number of the roller-engaging grooves is set to be greater than that of the rollers.

4. The starter according to claim 1, wherein:

the planet carrier has a cylindrical portion at a side opposite to a side of the pinion; and the roller accommodating grooves are formed on an inner peripheral face of the cylindrical portion of the planet carrier.

5. The starter according to claim 4, wherein:

the cylindrical portion of the planet carrier is provided at an inner side of a periphery of the internal gear.

6. The starter according to claim 4, wherein:

the stationary member has a cylindrical portion facing the cylindrical portion of the planet carrier and spaced radially at a predetermined distance therefrom; and the urging means brings the rollers into contact with the cylindrical portion of the stationary member.

7. A starter comprising:

a pinion engageable with a ring gear of an engine;

a motor having an armature and an output shaft for transmitting a rotation thereof to the pinion;

a planetary reduction gear mechanism including a sun gear provided on the output shaft of the motor, a planetary gear engaging the sun gear, a planet carrier supporting the planetary gear rotatably thereon and rotatable relative to the sun gear, and an internal gear surrounding and engaging the planetary gear to rotate the pinion; and a one-way clutch including a plurality of rollers accommodated in each of a plurality of roller-accommodating grooves formed on a peripheral face of the planet carrier and contacting a peripheral face of a stationary member, and urging means held by the planet carrier to urge the rollers toward the peripheral face of the stationary member, wherein the one-way clutch is adapted to shift, by a rotation of the planet carrier, the rollers to a clutch-disconnection side against the urging force of the urging means in an overrunning time, the planet carrier has a cylindrical portion at a side opposite to a side of the pinion, the roller-accommodating grooves are formed on an inner peripheral face of the cylindrical portion of the planet carrier, wherein:

the planet carrier includes a first cylindrical portion rotatably held on the output shaft;

a disk portion facing the planetary gear; and a second cylindrical portion having the roller-accommodating grooves formed on an inner peripheral face thereof.

8. The starter according to claim 7, wherein:

the disk portion of the planet carrier has a holding member for holding the planetary gear rotatably.

9. A starter comprising:

a pinion engageable with a ring gear of an engine;

a motor having an armature and a motor shaft for transmitting a rotation thereof to the pinion;

a planetary reduction gear mechanism including a sun gear provided on the motor shaft of the motor, a planetary gear engaged with the sun gear, a planet carrier supporting the planetary gear rotatably thereon and rotatable relative to the sun gear, and an internal gear surrounding and engaged with the planetary gear to rotate the pinion, the planet carrier having a cylindrical part which extends axially and has a roller-accommodating groove thereon;

a stationary member having a cylindrical part which extends axially and placed radially inside the cylindrical part of the planet carrier;

an urging member disposed in the roller-accommodating groove; and a roller accommodated in the roller-accommodation groove and normally urged by the urging member to contact with the cylindrical part of the stationary member thereby to restrict the planet carrier from rotating, the roller being movable in the roller-accommodating groove to disengage the planet carrier from the stationary member by a centrifugal force exerted in response to a rotation of the planet carrier at the time of over-running of the pinion and connecting the planet carrier with the stationary member when a rotation speed of the planet carrier decreases.

10. The starter according to claim 9, wherein the planet carrier has a disk part placed around the motor shaft, and the planetary gear is placed axially oppositely to the cylindrical part of the planet carrier with respect to the disk part.

11. The starter according to claim 9, wherein the stationary part has a plurality of roller-engaging grooves on the cylindrical part thereof which are engageable with the roller and are greater in number than the roller-accommodating groove on the planet carrier.

* * * * *